US005805825A

United States Patent [19]

Danneels et al.

[11] Patent Number: 5,805,825

[45] Date of Patent: Sep. 8, 1998

[54] METHOD FOR SEMI-RELIABLE, UNIDIRECTIONAL BROADCAST INFORMATION SERVICES

[75] Inventors: Gunner D. Danneels, Beaverton; Katherine Cox, Hillsboro; Robert M. Odell, Tigard; Robert A. Schlesinger, Hillsboro; Leora J. Gregory, Forest Grove; Ketan R. Sampat, Portland, all of Oreg.

[73] Assignee: Intel Corporation, Santa Clara, Calif.

[21] Appl. No.: 506,773

[22] Filed: Jul. 26, 1995

[51] Int. Cl.[6] .................... G06F 13/00

[52] U.S. Cl. .................... 395/200.73; 395/200.47

[58] Field of Search .................... 395/800, 200.81, 395/200.73, 200.47, 200.53, 200.61, 200.43, 200.3

[56] References Cited

U.S. PATENT DOCUMENTS

| | | | |
|---|---|---|---|
| 4,543,630 | 9/1985 | Neches | 395/200.01 |
| 5,057,932 | 10/1991 | Lang | 358/335 |
| 5,103,467 | 4/1992 | Bedlek | 375/118 |
| 5,230,073 | 7/1993 | Gausmann | 395/600 |
| 5,440,334 | 8/1995 | Walters | 348/6 |
| 5,506,809 | 4/1996 | Csoppenszky | 365/221 |
| 5,524,001 | 6/1996 | Beaudry | 370/73 |
| 5,602,836 | 2/1997 | Papadopoulos | 370/280 |
| 5,642,483 | 6/1997 | Topper | 395/200.13 |

OTHER PUBLICATIONS

Acharya, S., Alonso, R., Franklin, M., Zdonik, S., "Broadcast Disks: Data Management for Asymmetric Communication Environment," Dept. of Comp, Science, Brown University, Technical Report No. CS–94–43, Dec. 1994, pp. 1–26.

Zdonik, S., Franklin, M., Alonso, R., Acharya, S., "Are 'Disks in the Air' Just Pie in the Sky?," IEEE Workshop on Mobile Computing Systems and Applications, Santa Cruz, CA, Dec. 1994, to appear, pp. 1–8.

*Primary Examiner*—Eric Coleman

*Attorney, Agent, or Firm*—Blakely, Sokoloff, Taylor & Zafman

[57] ABSTRACT

An asymmetric communication protocol providing semi-reliable transmission with improved availability. Messages are provided to a scheduling sender which repeatedly rebroadcasts the data for a specified time period. Multiple messages are arranged in a data carousel with each message transmitted on each revolution of the carousel. Messages are removed as they become obsolete. Clients joining the broadcast late continue to have access to data on the carousel.

18 Claims, 8 Drawing Sheets

Server Purely Asymmetric

METHOD FOR SEMI-RELIABLE, UNIDIRECTIONAL BROADCAST INFORMATION SERVICES

BACKGROUND OF THE INVENTION

1. Field of the Invention

The invention relates to asymmetric communications. More specifically, the invention relates to a method and apparatus for addressing availability and reliability concerns in asymmetric transmissions.

2. Related Art

In a standard bi-directional communication system, the sender and the receiver can communicate back and forth as equals switching roles as necessary for the ongoing dialogue. In a client server environment, each client requests the necessary data from the server when it joins the group of recipients. In addition, if reliability is required, the client will acknowledge the receipt of the data to the server. If the server does not receive this acknowledgment, will resend the data to the particular client under the assumption that the client has not received the data. Transmission Control Protocol/Internet Protocol (TCP/IP) is commonly used to provide reliable transmission on a point-to-point link. TCP/IP requires a large number of acknowledgments to maintain reliability.

Current network-based applications do not move well to a multicast environment. Typically, they assume that there is a synchronization between the sender and the receiver of data. The sender does not transmit data until the receiver has indicated that it is ready to receive. A logical connection may be initialized between the two endpoints in which case the set-up of the connection provides the synchronization. An alternate method is for the receiver to signal the sender that a particular data item is requested. The sender then assumes that the receiver is ready for the data to be sent.

In a multicast environment, the synchronization between the sender and the receiver limits the scalability of the system. The sender cannot maintain synchronization with hundreds or thousands of receivers. Its processing power and network bandwidth required for the necessary control messages would quickly exhaust its resources. A different communications paradigm is needed when potentially hundreds or thousands of receivers of a broadcast exist.

In an asymmetric communication system, the sender or server receives little or in a purely asymmetric environment, no response communication from its clients. One example of a purely asymmetric communication system is cable television. In the cable television example, it is desirable to eliminate any ability to respond to the service because the sheer bulk of clients would overwhelm the system if clients were allowed to respond in any significant fashion. Similarly, with computer communications, it is frequently desirable for one sender to be able to send information to hundreds or even thousands of clients. In such a case, if each client were allowed to respond, it would quickly overwhelm the server. Unfortunately, since the clients are unable to communicate back to the server the problem of poor transmission and, therefore, lost data exist in asymmetric communications. Moreover, if a client joins a session already in progress, it is not possible for the client to request or receive the part of the message or program that was ongoing prior to the client's joining the session. This is referred to as the availability problem in asymmetric communication.

An on-line business presentation provides another illustrative example of an asymmetric communication with the attendant availability and reliability problems. Analogously to a "face-to-face" presentation, an on-line presenter may wish to provide a number of "hand-outs" to which the presenter intends to refer during the ongoing presentation. If these hand-outs are sent on an asymmetric link at the start of the meeting, first anyone not yet connected will not receive the hand-outs and will not be able to follow the references thereto and, second, even if a presentation attendee (client) is connected when the hand-outs are transmitted, interference or other external factors may lead to poor transmission and, accordingly, inaccurate data being received or data being lost entirely. Since this network is asymmetric, late arrivers cannot request the hand-outs, nor can the clients receiving garbled data request retransmission. This example is particularly apt because in real time applications, it will frequently be desirable to receive the relevant hand-outs of a presentation without receiving a voice or video of what has gone before.

Accordingly, it is desirable to develop a system which provides for availability and reliability in an asymmetric communication network with a dynamically variable client base wherein the asymmetry ranges from the case in which the client has a very limited back channel to complete asymmetry.

SUMMARY OF THE INVENTION

The present invention is a method and apparatus which addresses some of the deficiencies of current asymmetric communications protocols. Specifically, the invention addresses reliability and availability concerns in asymmetric communications. A data carousel which broadcasts messages provided by a server for a specified period of time is constructed. The carousel will cycle through its messages broadcasting each message once on each revolution. Accordingly, since each message is broadcast multiple times, the broadcast becomes more reliable because multiple opportunities to get the valid data exist Moreover, since the data is made available for a period of time, clients need not be on line for the initial broadcast. As a data item ages into obsolescence, it can be removed to avoid a waste of resources.

DETAILED DESCRIPTION OF THE INVENTION

In the following description, for purposes of explanation, specific details are set forth in order to provide a thorough understanding of the present invention. However, it will be apparent to one skilled in the art that the present invention may be practiced without the specific details. In other instances, well-known systems are shown in diagrammatic or block diagram form in order not to obscure the present invention unnecessarily.

Figure 1:
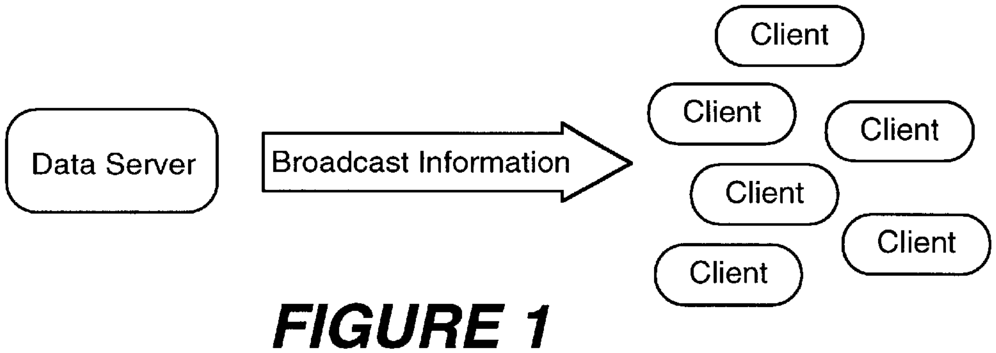
FIGURE 1 (Prior Art)
FIG. 1 is a block diagram of a prior art purely asymmetric network.

FIG. 1 shows a prior art purely asymmetric system in which a data server broadcasts information to a plurality of clients. This arrangement can arise either because the media does not permit the client to respond to the data server or because the sheer bulk of clients would overwhelm the server if the clients were allowed to respond at all. In such system, once the data server broadcasts the information, any client not yet on line will miss the opportunity to receive that information. Additionally, interference in the transmission line may cause clients, even those on line, not to receive all of the information broadcast by the server.

Figure 2:
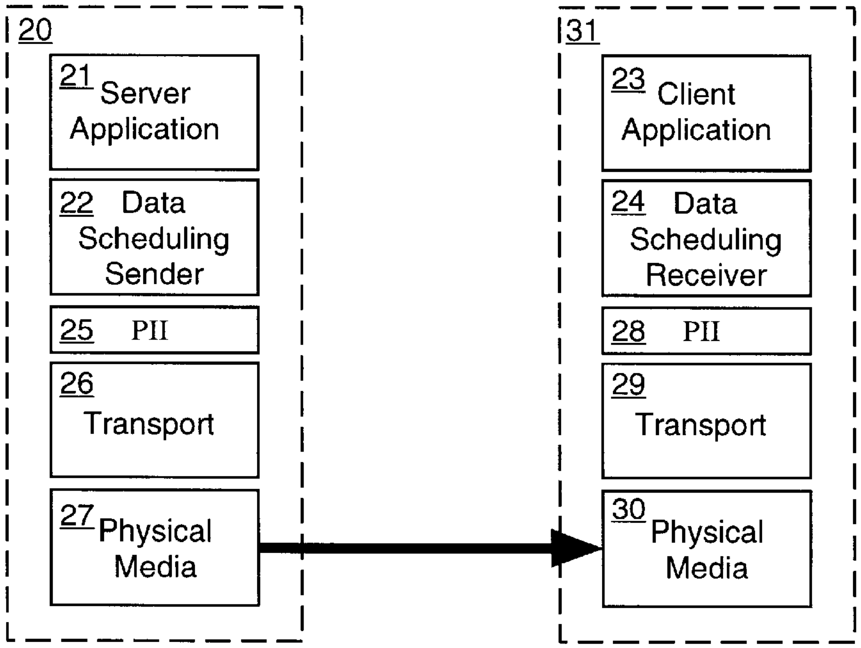
FIGURE 2 (Prior Art)
FIG. 2 is a block diagram of where the instant invention resides in system hierarchy.

FIG. 2 is a block diagram showing where the modules of the instant invention reside within a server system 20 or a client system 31. This drawing shows that the server application 21, client application 23 reside at the top of their respective hierarchies. Immediately below the respective applications are the data scheduling sender (DSS) 22 on the server side and the data scheduling receiver (DSR) 24 on the client side. Below the modules containing the instant invention are PII 25, 28, transport 26, 29, and physical media levels 27, 30 of the hierarchy in their respective systems. As with prior art systems, the actual transmission and receipt takes place at the physical media 27, 30 level of the hierarchy. The server application 21 sends a block of data to the DSS 22 specifying the number of bytes to be sent and the amount of time that the data should be available to the client(s) 31. The DSS 22 then organizes the data it has been sent into a data carousel fulfilling the timing and availability constraints imposed by the server application 21. Each message occupies a slot on the carousel. The number of slots is dynamically determinable by the data scheduling sender 22 at the time it creates the carousel. The carousel is created or recreated each time a message either enters or leaves the carousel. The data carousel continually revolves with each slot being transmitted on each revolution. If a message times out or is demanded back by the server application 21, it is removed from the carousel, and the carousel is reconstructed. It is recognized that recreation schemes may increase overhead as compared to other possible creation schemes, but it is anticipated that messages will remain available much longer than the latency created by the associated overhead. Other creation schemes in the continuum of establishing a carousel at the start of a session with a set number of slots and merely inserting and removing messages from the initially created slots up through the recreation of the entire carousel at every change of carousel, contents are contemplated as within the scope of the invention.

Figure 3:
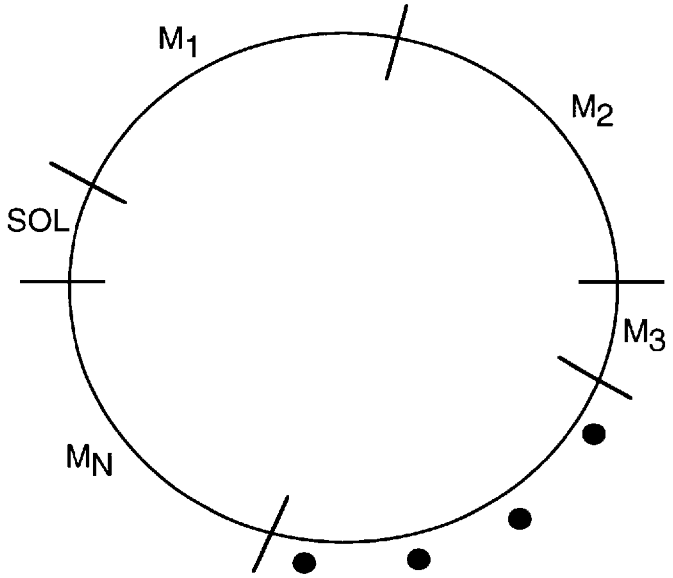
FIG. 3 is a flowchart of the building of the data carousel of the instant invention.

FIG. 3 depicts a data carousel for use in the same invention. This carousel is shown with a start of list signal and messages. If a sender for a data stream has a set of messages, $\{M_1M_2, \ldots, M_N\}$ that it wishes to send on a given multicast address $(A_D, P_D)$ to a set of receivers. In order to utilize the information, the receiver application must be able to get all of the messages, and, optionally, it must receive them in the order in which they were sent. In addition, the receiver must be able to start receiving the broadcast at $M_i$ and have the opportunity to receive all of the messages Mj such that j<i.

The server application 21 presents to the DSS 22 the set of currently available messages. The DSS has a limit on the bandwidth that it can allocate to the message stream. It begins by progressing through the list of messages from 1 to N sending each one on the multicast address. Any client(s) 31 that are currently active will receive the messages as they are first transmitted.

In order to make the data available for clients that may join the broadcast late, once the DSS 22 has transmitted message $M_N$ it restarts the stream at message $M_1$. This effectively organizes the set of available messages into a loop, or carousel, of data. Significantly, this carousel depicts messages of different sizes. Each iteration of the loop is preceded by a start of loop message (SOL) so that the clients can find the first message of the broadcast. The sender loops through the ordered set of messages continuously. As more messages arrive, they are appended to the end of the carousel. Messages can only be removed from the start of the carousel, if a message is removed from within the carousel, it is replaced by a control message specifying the message number that was removed.

The DSR 24 stores the arriving messages, dropping those duplicated because of iterations of the loop. Alternatively, the DSR 24 may not attempt to receive messages from slots previously received. The DSR 24 may choose to forward messages to the upper layer (client application 23) in any order or it may reconstruct the order on the sender. For example, if it finds that $M_3$ is missing but $M_4$ is available, it may choose to forward $M_4$ immediately and $M_3$ on the next iteration of the loop or it may choose to delay $M_4$ until after it can forward a valid copy of $M_3$.

In an alternate embodiment, all messages are relegated to the same size slot on the carousel. As a practical matter, this would lead to message fragmentation for large messages and some wasted space for small messages, but may reduce the overhead in reconfiguring the carousel as each message is added or removed.

Under either dynamically sizable or fixed size slot protocols, message fragmentation is required for very large messages where very large is defined to mean any message which cannot be transmitted over the allotted bandwidth as a single unit. Accordingly, each transmission begins with a message descriptor defining the overall attributes of the message, the total size, a pointer to the buffer, etc. Following the message descriptor are section descriptors. A section has an offset and a length and all the bytes of a section are either valid or invalid. A section may or may not correspond to one transmitted network fragment. For example, a message that had 4 network fragments that were all received could be described with one section descriptor whose offset is 0, the length is the total size of the message and it is valid. If the client application requests a message from the DSR, the message can be described with a completeness descriptor. If the application is able to make use of the valid part of a message, it is free to make best use of the available data.

Each iteration of the loop, another copy of the message can be retrieved with a different completeness descriptor. For example, the first time a message is transmitted, the receiver correctly got fragments 1, 2, and 5 of a 6 fragment message. On the second iteration, the receiver correctly got fragments 1, 4, 5, and 6. Merging these two completeness descriptors, and also the data of the two copies of the message gives a buffer and a completeness descriptor showing fragments 1, 2, 4, 5, 6 correctly received, and the section of the buffer corresponding to fragment 3 as invalid.

Figure 4:
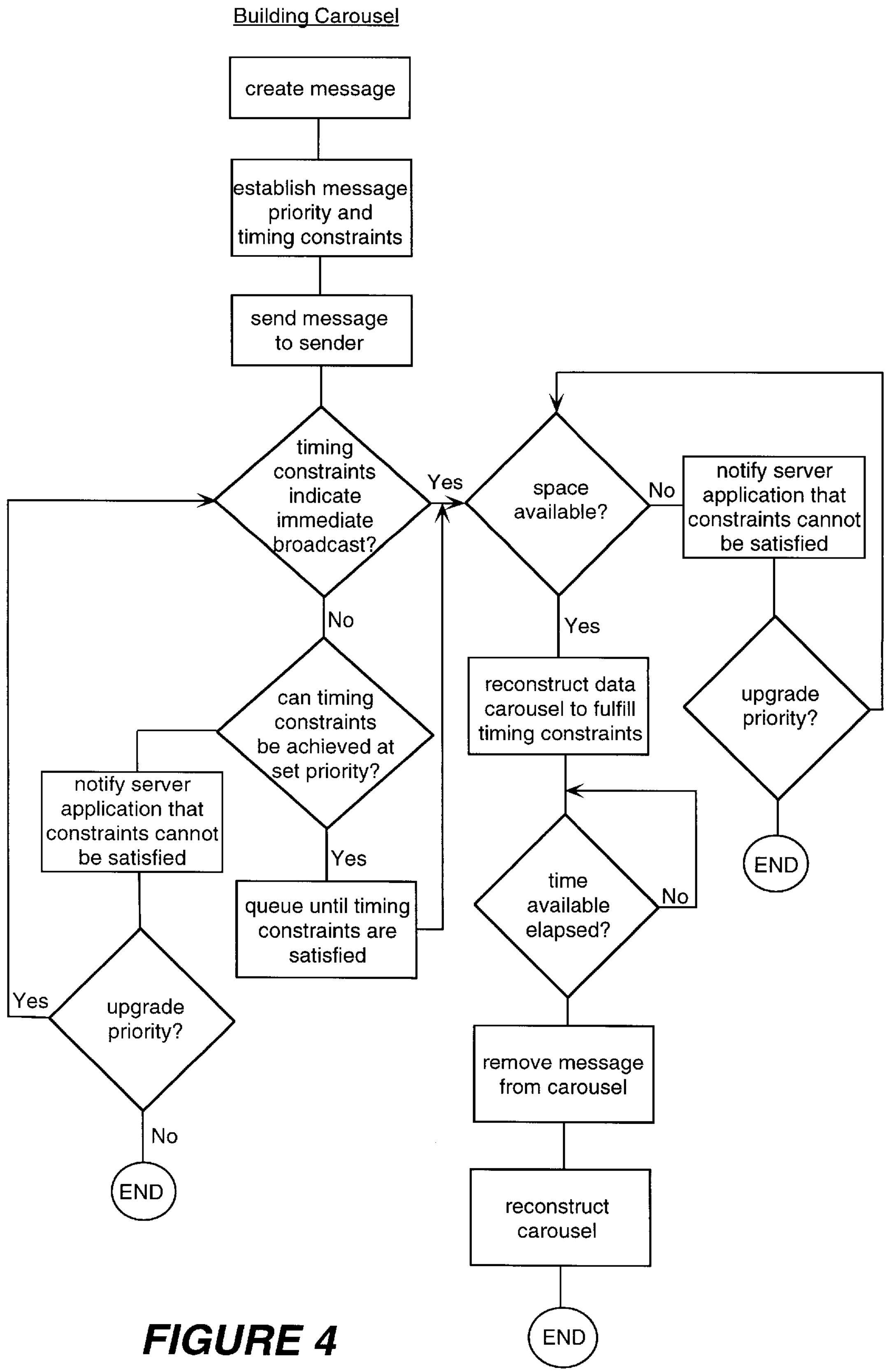
FIG. 4 is a flowchart of carousel activity in a purely asymmetric server.

FIG. 4 is a flowchart depicting the building and maintenance of the data carousel in one embodiment of the instant invention. In this embodiment, the server application 21 identifies a block of data it wishes to send to one or more clients 31. Such block of data may be partitioned into one or more messages. The server application 21 then attaches a priority and timing constraints to each message. For example, if in a given system the possible priority range is from 1 to 10 with 10 being highest priority, a server application 21 wishing to send two messages might choose to send message 1 at a priority of 6 and message 2 at a priority of 5 and specify that message 1 is to be available for one hour beginning at 9:00, while message 2 is to be available for 15 minutes beginning at 9:30. Having defined the priority and timing constraints, the server application 21 then sends the message or messages to the DSS 22 which is responsible for achieving reliable and available asymmetric transmissions.

The DSS 22 will check the timing constraints to determine if the messages should be made available to clients 31 immediately. If following the example above, it is currently 8:30, neither message should be made available to clients 31 at this time. The DSS 22 then analyzes the timing constraints and the priority to determine if at the subsequent time at which the message should be made available, space constraints within the data carousel will permit the timing constraints to be satisfied at the priority set. If, for example, the entire bandwidth was allotted to the data carousel in the 9:00 hour is filled with messages of priority 7 or higher, the DSS 22 will notify the server application 21 that the specified constraints can not be satisfied and allow the application to upgrade the priority or change the timing constraints of the message. If the server application 21 chooses not to upgrade the priority or change the timing constraints, the DSS 22 discards the message. If the server application 21 does upgrade the priority or change the timing constraints, this process is repeated until either the timing constraints indicate immediate broadcast or the DSS 22 identifies that the timing constraints can be achieved at the set priority then existing in the environment. If timing constraints do not yet indicate immediate broadcast, the prospective message is queued until the timing constraints are satisfied. In the example, such would occur at 9:00 and 9:30 for messages 1 and 2, respectively.

When the timing constraints indicate immediate broadcast, the data carousel is checked for available space. If there is no space available at the specified priority, the server application 21 is notified that the constraints cannot be satisfied and given the opportunity to upgrade priority following the pattern discussed above until space is available at the specified priority. If space is available, the data carousel is constructed to fulfill the timing constraints of each message in addition to the length of time available, the frequency available (e.g. once/sec; once/min) is considered to be among the timing constraints. The DSS determines at each moment if the time a given message on the carousel is to be available has elapsed. Once the time elapses, the message is removed from the carousel and the carousel is reconstructed with only the messages for which the time available has not elapsed remaining on the newly constructed carousel. It is also envisioned that the server application 21 could recall the message at any time prior to the end of the originally specified time. Such is not within the flow of the normal operation and, accordingly, is not depicted in FIG. 3. However, the value of such feature will be apparent to one of ordinary skill in the art insofar as data may become obsolete prior to the satisfaction of its timing constraints. In such case, it would be desirable to remove from the carousel rather than use bandwidth and space on the carousel for obsolete or irrelevant data. However, such removal may necessitate a place holding control message occupying the space on the carousel so a client 31 will not wait indefinitely on a message that has been removed. This need can be obviated by continually maintaining a control carousel of very low bandwidth which indicates what messages are available at any time (as discussed below). Similarly, if the carousel is full and an urgent message is forwarded by a server application 21, a lower priority message may be bumped from the carousel before its timing constraint can be completely satisfied. At such time, the server application 21 may be given the opportunity to upgrade priority or change the timing constraint as discussed above. In some cases, a message may be duplicated on the carousel to satisfy timing constraints. For example, if enough messages exist, the one revolution of a carousel takes one second, and a message is required to be sent twice per second. Placing the message on the carousel twice will accomplish this result. In one embodiment, the DSS 22 automatically expands the carousel by duplication of messages to fill the maximum allotted bandwidth, while in an alternate embodiment, the carousel uses only the bandwidth required to satisfy the specified parameters of the messages to be broadcast up to the maximum allotted bandwidth.

Figure 5:
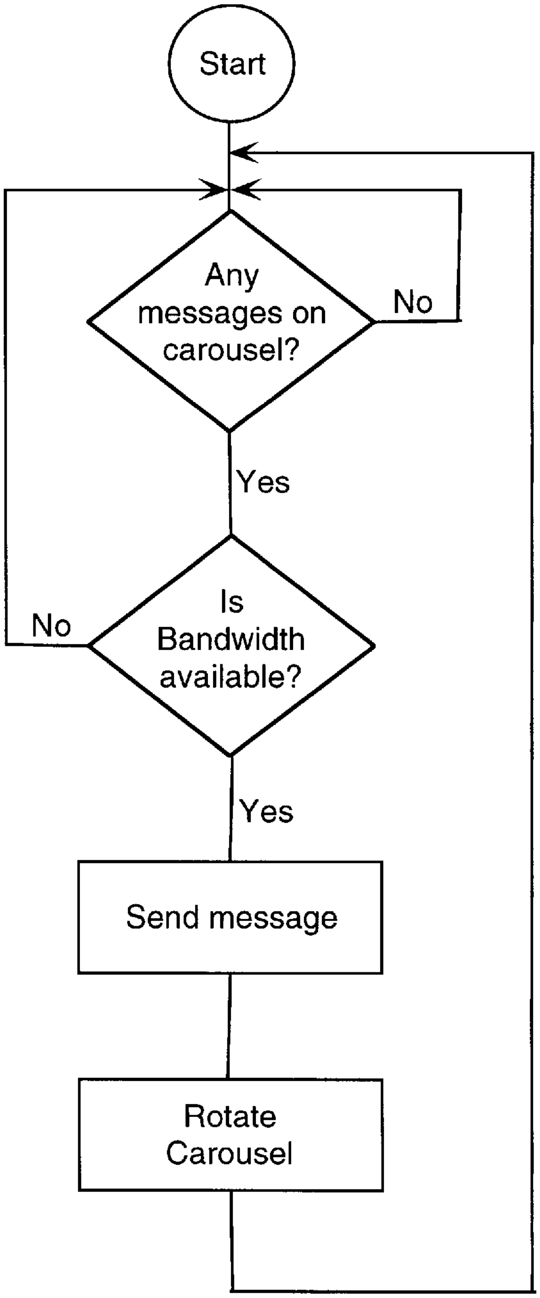
FIG. 5 is a flowchart of the broadcast behavior of the server having a limited back channel.

FIG. 5 is a flowchart of the operation data carousel which will function properly in a purely asymmetric or a multicast environment. Initially, the carousel identifies if any messages exist on the carousel. Assuming there are messages, it must determine if there is bandwidth available on the media over which the message is to be sent. If there is no bandwidth available, it continues to identify whether or not messages exist on the carousel until bandwidth becomes available. It may also at this time notify the server application that the message is not being sent because there is insufficient bandwidth available on the media. If bandwidth is available, a message in the send slot is sent and the carousel is rotated so that the next message around the carousel is in line to be sent at the next opportunity. The carousel then repeats the check for messages on the carousel and bandwidth before sending the message in the send slot.

Figure 6:
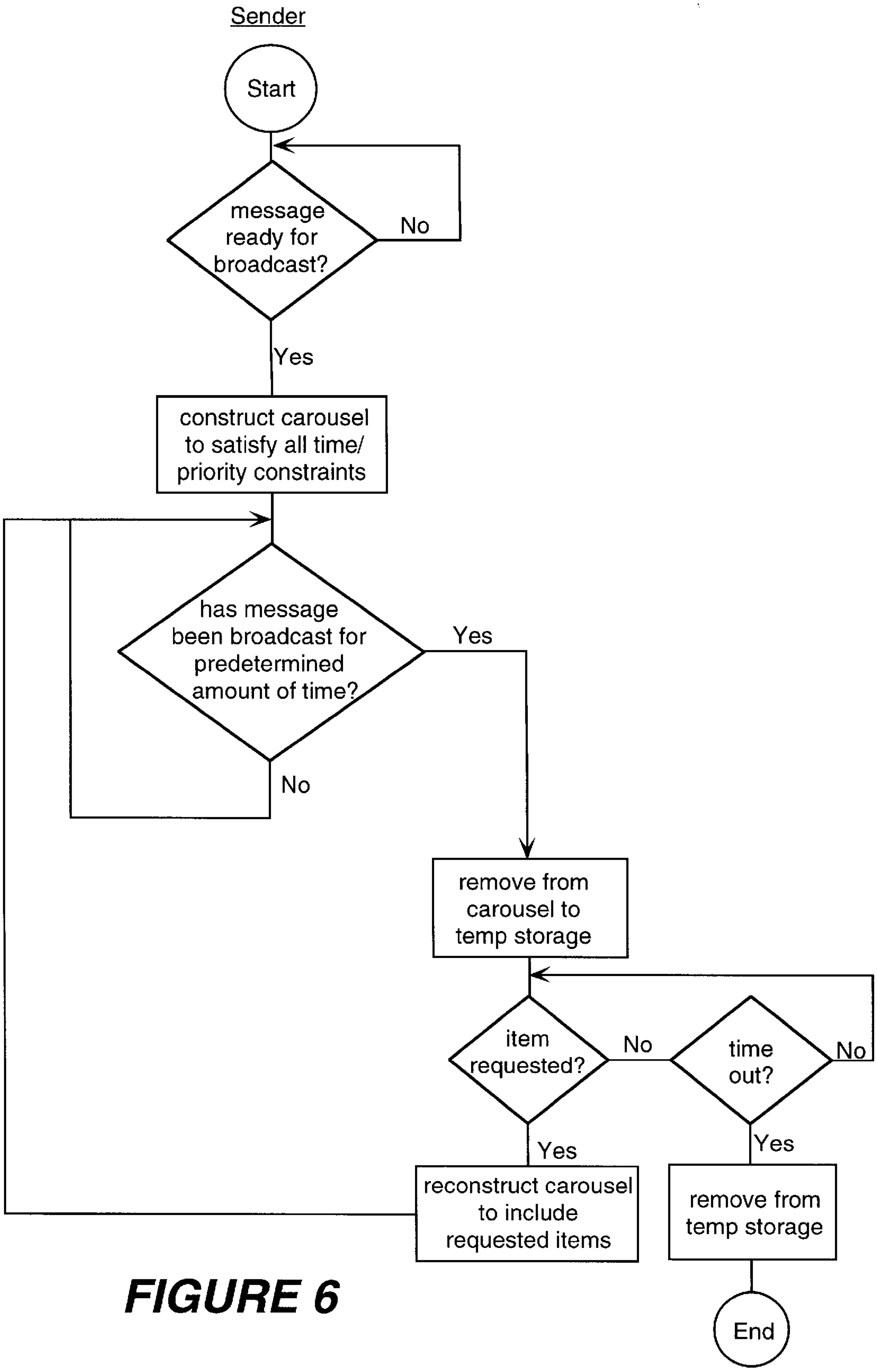
FIG. 6 is a flowchart of the client's activity when the client is permitted a limited back channel.

FIG. 6 is a flowchart reflecting DSS 22 operation in an alternate embodiment of the invention. In this embodiment, a temporary storage facility is provided to store messages whose time available has not yet elapsed, but which have been available long enough that continued broadcasting is no longer a desirable use of resources. When a packet is placed into the carousel, it need not be sent throughout its lifetime. Most of the clients 31 will get a copy of the data within the first few iterations of the carousel. If we assume that most clients 31 will join early in the broadcast, after some point in time there will be very few joiners and all of the current clients 31 will have received the message. At this point, the message may be removed from the carousel.

In this embodiment, the server application 21 forwards the message to the DSS 22 when the message is ready for broadcast. Accordingly, this DSS 22 waits for a message until one becomes available. At such time, the DSS 22 constructs a data carousel to satisfy all time and priority constraints of all messages to be broadcast. The carousel watches each message to determine if it has been broadcast a predetermined amount of time (which is still less than its total time available). The amount of time before storing could be provided by the server application based on a message use profile of a given message or it may be determined by the DSS 22 as the source for all messages. If it has, it is removed to the temporary storage. The particular message remains in temporary storage until the item is reactivated by a request of a client or it times out, i.e. the time available elapses or it is demanded back by the server application 21. If the message times out, it is discarded. If the item is requested, the carousel is reconstructed to include the requested item. The time broadcast and acknowledge rate are again checked until the item is removed to temporary storage. The time available after reactivation need not be the same as the initial active time.

In one embodiment, the SOL contains information indicating what messages are on the carousel and what messages are in the temporary storage at any time. By providing a separate and distinct multicast address ($A_C$, $P_C$) over which SOL is broadcast, the DSS 22 creates the illusion that a separate and distinct control carousel of very low transmission bandwidth exists. Moreover, this allows access to the important control information even when all data is passive. This is discussed more fully below. It would also be possible to create a distinct control data structure using a similarity limited bandwidth. Such is within the scope and contemplation of the instant invention. This allows a client 31 coming on line to identify what messages it does not have which are still available and which ones it must request in order to receive. Further, should server application 21 prematurely remove an item from the carousel as discussed above in connection with the other embodiment, the control information will reflect that it is not available and any client not yet having received the removed message need not wait indefinitely for it to come around again.

The DSS 22 defines a time limit after which a message is removed from the carousel and placed into temporary storage for later retrieval. A message is called active if it is currently on the carousel and passive if it is in the temporary storage. The carousel then consists of all active messages. If data does not continue to arrive from the server application 21, eventually, all messages will be passive and the carousel will be empty. At this point the broadcast can stop. The bandwidth necessary for the broadcast is thus freed up.

The age after which the message is made passive is defined by the DSS 22 and can be estimated based on the expected use of the application. If the application expects to be used in a very dynamic environment, it may allow message to be active for a longer period of time. If it is to be used in an environment where most of the clients are ready at the beginning of a broadcast, the messages can be active for a relatively short period of time.

In either case, the carousel must allow for a passive message to be re-activated when a new client joins the broadcast. Control signals will be allowed from the receivers to the sender requesting that particular messages be activated. This trades off the savings in broadcast bandwidth with the bandwidth from the receivers back to the sender in the activation requests. If there are frequent requests for a message, the message should stay active for a relatively long period of time after an activation. If there are few requests, it can stay active for a shorter period of time. There are two tunable parameters, the time that a message stays active initially and the time that it stays active after an activation request.

The DSS 22 will periodically multicast on ($A_C$, $P_C$) a block of information specifying all of the available messages and an indication of whether they are active or passive. Where the SOL is used as the control carousel, the broadcast is once per carousel revolution. If a DSR 24 finds that a message that it needs is passive, it sends an activation request to the DSS 22 on the control multicast address. In order to avoid flooding the DSS 22 with requests, the DSR 24 uses a random backoff algorithm to determine when they send their activation requests. A client monitors ($A_C$, $P_C$) for a random period of time before sending the request. If it finds that another DSR 24 requests the same message, it simply receives the message when it is activated in fulfillment of the other client's request. If it does not see a request for the message that it needs, it issues its own request only after the random wait period.

Figure 7:
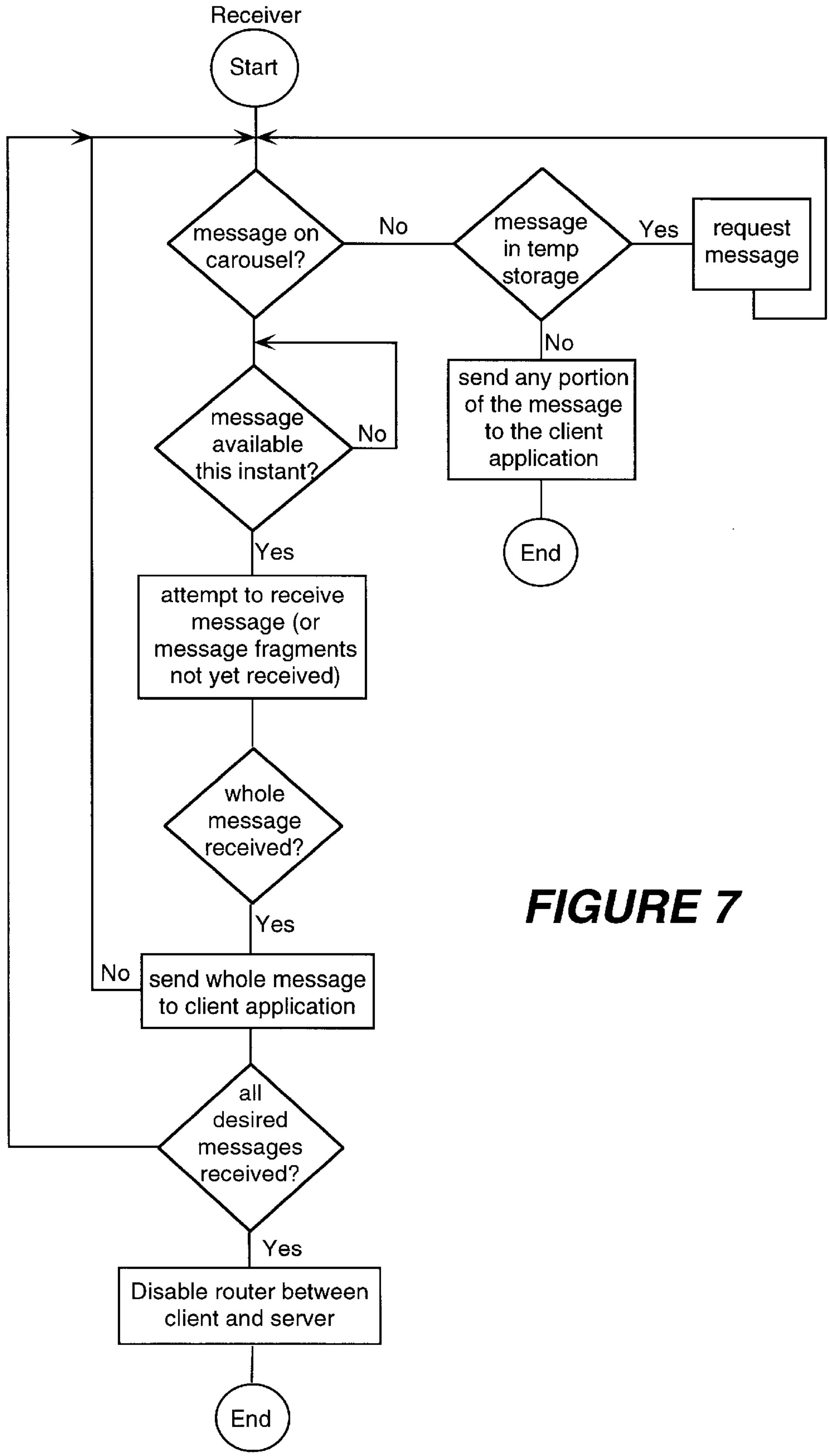
FIG. 7 is a diagram of an example of a dynamically configurable data carousel.

FIG. 7 is a flowchart showing operation of one embodiment of the invention from the client prospective. Once a client comes on line, the DSR checks to determine if a desired message is on the carousel. If the message is not on the carousel, it checks to determine if the message is in temporary storage. If the message is not in temporary storage, the DSR sends any portion of the message previously (and not yet forwarded) received to the client application which may then determine whether the portion of the message is of any value or should be discarded. If the message is in temporary storage, the DSR 24 sends a request that the message be reinstalled on the carousel. Once a message is on the carousel, the DSR 24 determines if the message is being transmitted at a particular instant. If not, the DSR 24 waits until the message is available. If the message is available at the particular instant, the DSR 24 attempts to receive the message or any portion of the message not yet received. The DSR 24 then identifies whether the entire message has been received. If it has, the message is forwarded to the client application 23. If it has not, it again checks to see if the message is on the carousel and so forth. After the message is forwarded to the client application, the DSR 24 identifies whether all desired messages that are currently available either on the carousel or in temporary storage have been received. If such is the case, the DSR 24 disables the data carousel multicast address between the client 31 and the server 20. This will effectively disable any router between the server 20 and client 31 when no additional clients are on the disabling clients' side of the router, with respect to the data carousel. The control carousel, transmissions having a different multicast address continue to be routed to allow the receiver to be reawakened should additional messages become available. This is described more fully below.

Figure 8:
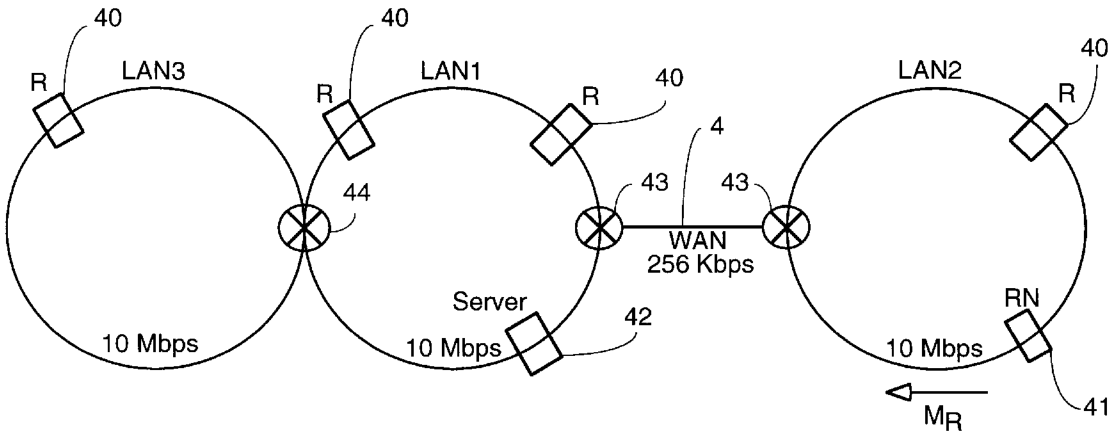
FIG. 8 is a diagram of a network including three LANs and a LAN.

FIG. 8 shows a network having three LANs. With LAN 1 coupled to LAN 2 by a WAN4, routers 43, 44 exist at either end of the WAN4 and at the interconnection between LAN1 and LAN3. A server on LAN 1 provides data to clients on LANs 1–3. In one embodiment of the instant invention, the size of the data carousel is always equal to the maximum permitted bandwidth allotted to the carousel, any short fall between bandwidth allotted the carousel and the bandwidth of the messages on the carousel being filled by duplicative iterations of the messages on the carousel. In an alternate embodiment, the size of the carousel is equal to the size of the messages on the carousel up to some predetermined maximum bandwidth. The network of FIG. 8 demonstrates a case in which neither arrangement could be problematic. Take the case of two 10 Mbps LAN1, 2 segments interconnected via a 256 Kbps WAN4 link. The server 42 loads the local 10 Mbps LAN1 segment, 256 Kbps of the data is received at the remote LAN2 segment. The receiver then is unable to receive most of the broadcast, the WAN link is fully utilized throughout the data broadcast, and large numbers of packets are dropped at the entrance to the WAN link. Clearly, this situation should be avoided.

Therefore, when the server application sets up a carousel, it will specify the maximum bandwidth that is to be used. The DSS will then throttle its broadcast to a bandwidth which will not flood the network. In the above example, the server application may specify a bandwidth of 1 Mbps. The DSS may then throttle the transmission to 100 bps. The DSS may notify the server application of the slow down in transmission. Additionally, once no multicast data addresses remain open on LAN2 (discussed more fully below), the bandwidth could be dynamically throttled back up to the 1 Mbps originally specified. Note throttling will affect the amount of message fragmentation required. The time between iterations of the carousel is then the number of bytes in the loop divided by the bandwidth throttle. As more messages are added to the carousel, the time between iterations necessarily increases.

For the above example, this solves the problems associated with the limited bandwidth WAN4 link since the sender can now throttle the data broadcast to some percentage of the WAN4 throughput. This would allow WAN4 bandwidth to remain available to other users. As long as other users don't overload the WAN4 link, there would then be sufficient bandwidth for the broadcast on all intermediate links in the network, and packets will not be dropped by the intermediate nodes.

In one embodiment, implementation of the throttle is a periodic timer. Every timer interval, some part of a message is sent. The timer period is such that the number of periods per second multiplied by the number of bytes per message segment is equal to the desired bandwidth.

The feature described in which data is aged until put in temporary storage thereby allowing the stopping of the carousel after a period of time will save network bandwidth on all paths within the multicast group. Unfortunately, when one site joins the group and requests that the carousel be started again, the carousel uses bandwidth along paths to all members of the group. This occurs even though only one site is going to get new data from the carousel. By employing features of existing infrastructure, this problem can be alleviated. Part of the network infrastructure to support multicast communications is that the routers in the network insure that the multicast data get to all nodes that are members of the multicast group. In addition, the routers prune off paths to those clients that have left the multicast group to conserve bandwidth on those paths.

Using this fact, the client can close the carousel's data address ($A_D$, $P_D$) when it determines that it has received all desired data on the carousel. The node will remove itself from the multicast group corresponding to address ($A_D$, $P_D$) and hence the routers will prune the path to this node from the route taken by the multicast packets. If each node performs this operation, and then the carousel stops, when a node joins the group and requests that the carousel be restarted, the routers will insure that the path to the new node is the only path that the packets are taking. This saves bandwidth on all other links in the network. For example, in FIG. 8, if at the beginning of a broadcast server 42 and clients 40 are all on line and all clients 40 receive all messages on the first iteration of the carousel, they may then disable the multicast address ($A_D$, $P_D$) corresponding to the data carousel. The routers 43, 44 then effectively prevent the server from chewing up bandwidth on networks having no active clients. When client RN 41 joins the group, routers 43 will allow the messages on the carousel to again flow across the WAN, but router 44 will prevent the use of bandwidth on LAN3. As should be clear, had the new client joined on LAN1, no bandwidth would be used on LAN3, WAN4, or LAN2. Similarly, if a new client joins on LAN3, the bandwidth of the WAN4 and LAN2 would be uneffected.

Figure 9:
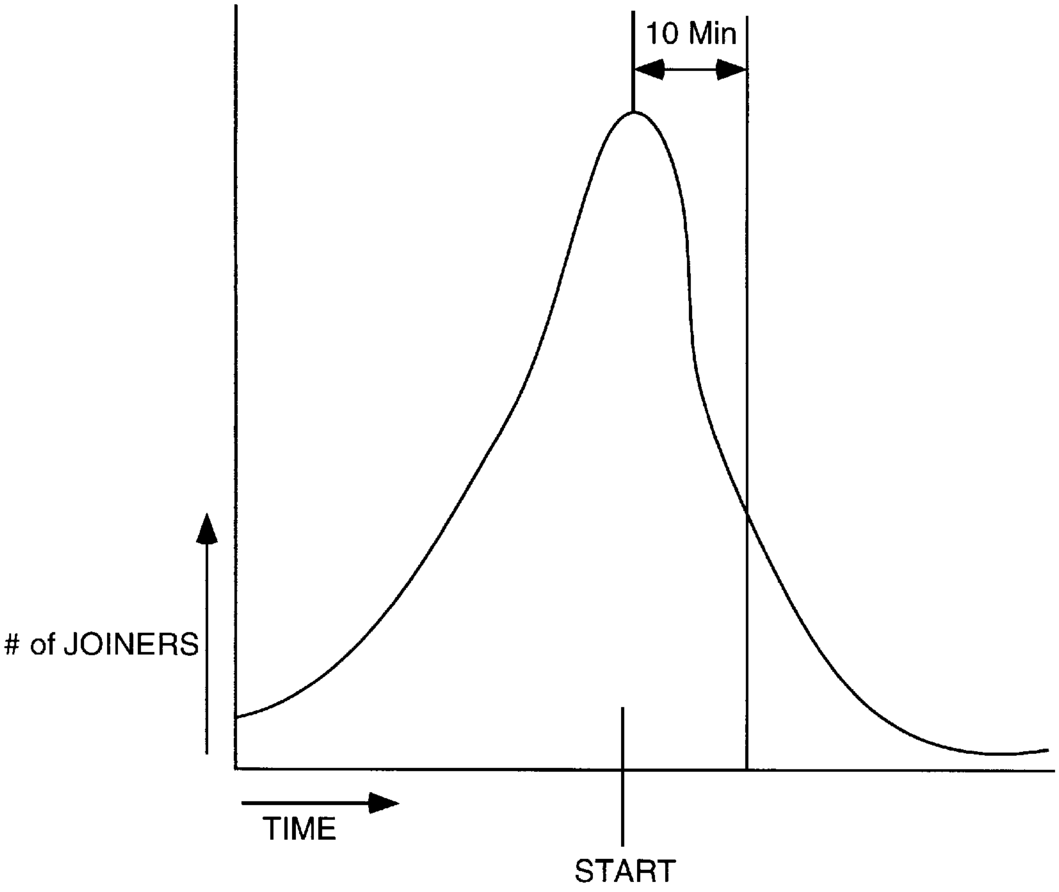
FIG. 9 is a graph of number of joiners of a meeting to time for the start of a prospective meeting.

FIG. 9 is a graph depicting an example arrival time of meeting goers. As can be seen, the overwhelming majority of joiners join the meeting within 10 minutes of the meeting start time. Accordingly, on the embodiment discussed above, it may be desirable to remove a message to temporary storage 10 minutes after the start of a prospective meeting, yet maintain it in a temporary storage such that it could be requested until the end of such meeting. In this way, "handouts" for the meeting would be available to late joiners via a request that such handouts be placed back on the carousel. It is desirable to have late joiners implement the random backoff algorithm discussed above before requesting a message put back on the carousel.

In the foregoing description, many features are set forth in the context of a single message. It is envisioned that this description is readily applicable to a plurality of messages with the routines described applied to each individual message. Moreover, it is anticipated that a single data scheduler could accept messages from multiple server applications with the same or different client bases. Accordingly, it is envisioned that data carousels (and control carousels) for the various applications could be either distinct or allow message interleaving. Such is within the ability of one of ordinary skill in the art given the instant disclosure.

In the foregoing specification, the invention has been described with reference to specific embodiments thereof. It will however be evident that various modifications and changes made thereto without departing from the broader spirit and scope of the invention as set forth in the appended claims. The specification and drawings are accordingly, to be regarded in an illustrative rather than a restrictive sense. Therefore, the scope of the invention should be limited only by the appended claims.

We claim:

1. A method of providing asymmetric communications between a server and at least one client comprising the steps of:

(a) generating at least a first message in a server application;

(b) establishing parameters including a message priority, a message start time and a message available time for each message generated;

(c) passing the message to a sender;

(d) constructing a revolving data carousel for holding a plurality of messages;

(e) transmitting each message on the carousel to a receiver on each revolution of the data carousel; and (f) removing each message from the carousel.

2. The method of claim 1 wherein the step of removing comprises:

(a) determining if a first predetermined time has elapsed;

(b) moving the message from the data carousel to a temporary storage; and (c) rebuilding the carousel.

3. The method of claim 1 further comprising the steps of:

notifying the application if the parameters cannot be satisfied;

allowing the application to change the parameters;

disposing of the message if the application does not change the parameters.

4. The method of claim 1 wherein the data carousel has a plurality of possible message positions all of equal size.

5. The method of claim 1 wherein the data carousel is constructed to have a plurality of dynamically sizable message spaces.

6. The method of claim 1 further comprising:

disabling a data channel between the sender and a receiver when the receiver has received a subset of the messages on the carousel, wherein the subset is all the messages required by a client.

7. An asymmetric communication apparatus comprising:

a server application for generating messages residing in a server;

a data scheduling sender responsive to the server application wherein the data scheduling sender creates a data carousel for repeatedly sending messages to a dynamically changing client base, wherein the data scheduling sender further comprises a holding area for holding a message having a parameter that cannot currently be satisfied; and a temporary storage unit coupled to the data scheduling sender for storing messages that may be activated to the data carousel.

8. The asymmetric communication apparatus of claim 7 wherein the data scheduling sender adds messages to and removes messages from the data carousel based on a parameter provided by the server application.

9. The asymmetric communication apparatus of claim 7 wherein the server application may demand removal of a message notwithstanding its parameters.

10. The asymmetric communication apparatus of claim 7 wherein the data scheduling sender places messages into the temporary storage after a predetermined time, the stored messages reactivated responsive to a request by a client.

11. An asymmetric communication apparatus comprising:

a server application for generating messages residing in a server;

a data scheduling sender responsive to the server application wherein the data scheduling sender creates a data carousel for repeatedly sending messages to a dynamically changing client base;

a temporary storage unit coupled to the data scheduling sender for storing messages that may be activated to the data carousel;

a data scheduling receiver residing in each of a plurality of clients for interfacing between the data scheduling sender and a client application residing in a client wherein the data scheduling receiver comprises buffers for storing received message fragments;

means for collecting and reconstructing a message from the message fragments independent of an order the fragments are received before forwarding the message to the client application; and means for disabling a transmission channel between the server and client.

12. The asymmetric communication apparatus of claim 11 wherein the data scheduling receiver further comprises means for requesting messages be activated from the temporary storage to the data carousel.

13. The asymmetric communication apparatus of claim 12 wherein the data scheduling receiver implements a random backoff algorithm before requesting activation.

14. An asymmetrical communication apparatus comprising:

a server application for generating messages residing in a server; and a data scheduling sender responsive to the server application, wherein the data scheduling sender creates a data carousel for repeatedly sending messages to a dynamically changing database and a control carousel for indicating a status of available messages.

15. A method of providing asymmetric communications between a server and at least one client comprising the steps of:

(a) generating at least a first message in a server application;

(b) establishing parameters for each message generated;

(c) passing the message to a sender;

(d) constructing a revolving data carousel for holding a plurality of messages;

(e) transmitting each message on the carousel to a receiver on each revolution of the data carousel;

(f) maintaining a control carousel specifying messages available on the data carousel; and (g) removing each message from the carousel.

16. A method of providing asymmetric communications between a server and at least one client comprising the steps of:

generating at least a first message in a server application;

establishing parameters for each message generated;

passing the message to a sender;

constructing a revolving data carousel for holding a plurality of messages;

transmitting each message on the carousel to a receiver on each revolution of the data carousel;

determining if a first predetermined time has elapsed;

moving the message from the data carousel to a temporary storage;

rebuilding the carousel; and reactivating the message responsive to a client request.

17. A method of providing asymmetric communications between a server and at least one client comprising the steps of:

generating at least a first message in a server application;

establishing parameters for each message generated;

passing the message to a sender;

constructing a revolving data carousel for holding a plurality of messages;

transmitting each message on the carousel to a receiver on each revolution of the data carousel;

permitting the application to demand immediate removal of the message notwithstanding the parameters; and placing a control message on the data carousel in a location previously occupied by the message.

18. A method of providing asymmetric communications between a server and at least one client comprising the steps of:

generating at least a first message in a server application;

establishing parameters for each message generated;

passing the message to a sender;

constructing a revolving data carousel for holding a plurality of messages;

transmitting each message on the carousel to a receiver on each revolution of the data carousel;

removing each message from the carousel;

forwarding valid messages to a client application if the whole message has been received; and forwarding valid message fragments to the client application if missing message fragments are no longer available on the carousel.

* * * * *